(12) United States Patent
Ansari

(10) Patent No.: US 10,367,442 B2
(45) Date of Patent: Jul. 30, 2019

(54) TRANSPORTABLE HYBRID POWER SYSTEM

(71) Applicant: Reza Ansari, Lake Quivira, KS (US)

(72) Inventor: Reza Ansari, Lake Quivira, KS (US)

(73) Assignee: HCI Energy, LLC, Lake Quivira, KS (US)

(*) Notice: Subject to any disclaimer, the term of this patent is extended or adjusted under 35 U.S.C. 154(b) by 234 days.

(21) Appl. No.: 15/500,788

(22) PCT Filed: Oct. 14, 2016

(86) PCT No.: PCT/US2016/057179
§ 371 (c)(1),
(2) Date: Jan. 31, 2017

(87) PCT Pub. No.: WO2017/066669
PCT Pub. Date: Apr. 20, 2017

(65) Prior Publication Data
US 2018/0358919 A1    Dec. 13, 2018

Related U.S. Application Data

(63) Continuation-in-part of application No. 14/883,335, filed on Oct. 14, 2015, now Pat. No. 9,780,720, which (Continued)

(51) Int. Cl.
*H01L 31/044* (2014.01)
*H02S 10/40* (2014.01)
(Continued)

(52) U.S. Cl.
CPC .............. *H02S 10/40* (2014.12); *F03D 9/007* (2013.01); *F03D 9/11* (2016.05); *G06F 1/30* (2013.01);
(Continued)

(58) Field of Classification Search
CPC ........ H01L 31/00–31/078; Y02E 10/50–10/60; H02S 10/00–10/40;
(Continued)

(56) References Cited

U.S. PATENT DOCUMENTS 4,136,432 A  1/1979  Melley, Jr.
5,969,501 A  10/1999  Glidden et al.
(Continued)

OTHER PUBLICATIONS

"International Search Report & Written Opinion; PCT/US2016/057179, dated Dec. 28, 2016".

*Primary Examiner* — Bach T Dinh
(74) *Attorney, Agent, or Firm* — Law Office of Mark Brown, LLC; Christopher M. DeBacker

(57) ABSTRACT

A transportable, deployable power system comprising a hybrid power box containing solar panels, wind turbine(s), fuel cells, fuel reformers, and other energy sources. The system could also include waste water and potable water inlet and outlet ports for water treatment. It will also allow for shelf mounted solar and wind turbine installation for disaster recovery, backup power for telecommunication, military power, Homeland Security power, off grid homes and water and wastewater packaging domestically and internationally. The present invention is ideal for any situation requiring immediate power and/or water treatment, such as remote construction sites or in emergency situations. The hybrid power box can be mounted to a standard shipping truck, train, or ship, and transported over land to the desired location.

12 Claims, 18 Drawing Sheets

Related U.S. Application Data is a continuation-in-part of application No. 13/769,113, filed on Feb. 15, 2013, now Pat. No. 9,221,136.

(60) Provisional application No. 61/600,094, filed on Feb. 17, 2012.

(51) Int. Cl.
*G06F 1/30* (2006.01)
*F03D 9/00* (2016.01)
*H02J 3/38* (2006.01)
*F03D 9/11* (2016.01)
*H02S 10/12* (2014.01)
*H02J 7/00* (2006.01)
*H02J 7/35* (2006.01)

(52) U.S. Cl.
CPC .............. *H02J 3/381* (2013.01); *H02J 3/383* (2013.01); *H02J 3/386* (2013.01); *H02J 3/387* (2013.01); *H02J 7/0042* (2013.01); *H02J 7/355* (2013.01); *H02S 10/12* (2014.12); *F05B 2240/142* (2013.01); *Y02B 10/14* (2013.01); *Y02B 10/30* (2013.01); *Y02B 10/70* (2013.01); *Y02E 10/563* (2013.01); *Y02E 10/72* (2013.01); *Y02E 10/763* (2013.01)

(58) Field of Classification Search
CPC ......... H02S 20/00–20/32; H02S 30/00–30/20; H02S 40/00–40/44; H02S 50/00–50/15
USPC .................................................. 136/243–265
See application file for complete search history.

(56) References Cited

U.S. PATENT DOCUMENTS

| | | | |
|---|---|---|---|
| 6,393,775 B1 | 5/2002 | Staschik | |
| 7,081,682 B2 | 7/2006 | Campion | |
| 7,150,153 B2 | 12/2006 | Browe | |
| 7,230,819 B2 | 6/2007 | Muchow et al. | |
| 7,239,719 B2 | 6/2007 | Muchow et al. | |
| 7,288,192 B2 | 10/2007 | Jowett | |
| 7,615,876 B2 | 11/2009 | Marshall | |
| 8,191,321 B2 | 6/2012 | McClellan et al. | |
| 8,376,282 B2 | 2/2013 | Keller | |
| 8,593,102 B2 | 11/2013 | McGuire et al. | |
| 8,988,037 B1 | 3/2015 | Woodall et al. | |
| 9,109,814 B2 | 8/2015 | Patton | |
| 9,046,281 B2 | 12/2015 | Curran | |
| 9,221,136 B2 | 12/2015 | Ansari | |
| 2006/0260672 A1 | 11/2006 | Niederer | |
| 2008/0068782 A1 | 3/2008 | Muchow et al. | |
| 2011/0023864 A1 | 2/2011 | Andretich | |
| 2011/0253614 A1 | 10/2011 | Curran et al. | |
| 2012/0023716 A1 | 2/2012 | Bellacicco et al. | |
| 2012/0201016 A1* | 8/2012 | Robertson | F21L 4/08 362/183 |
| 2013/0073099 A1 | 3/2013 | Bronicki | |
| 2014/0231284 A1* | 8/2014 | Ansari | B23P 19/04 206/216 |

* cited by examiner

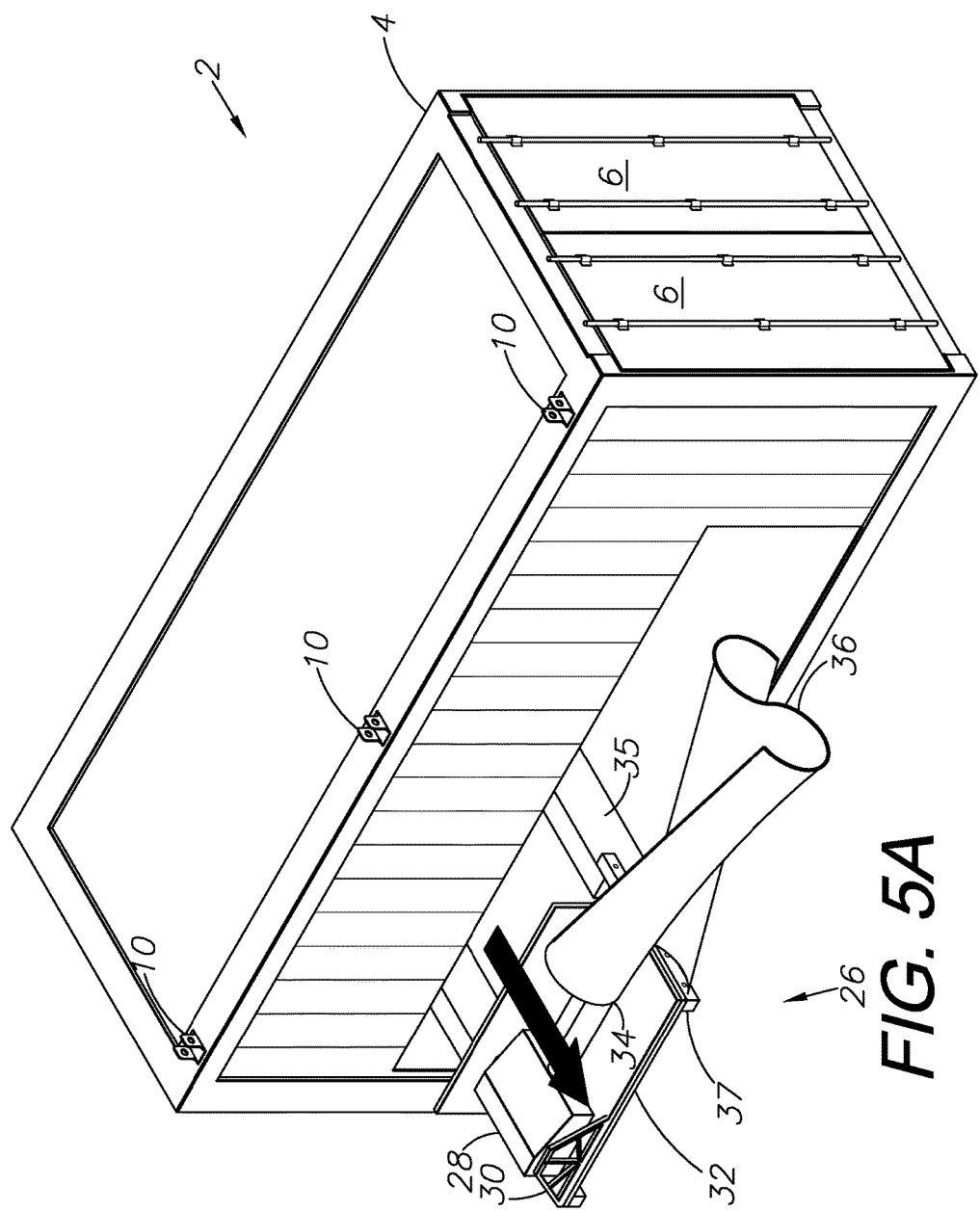

TRANSPORTABLE HYBRID POWER SYSTEM

CROSS-REFERENCE TO RELATED APPLICATIONS

This application claims priority International Application No. PCT/US2016/057179, filed Oct. 14, 2016, and is also a continuation-in-part of and claims priority in U.S. patent application Ser. No. 14/883,335, filed Oct. 14, 2015, which is a continuation-in-part of and claims priority in U.S. patent application Ser. No. 13/769,113, filed Feb. 15, 2013, now U.S. Pat. No. 9,221,136, which claims priority in U.S. Provisional Patent Application No. 61/600,094, filed Feb. 17, 2012, all of which are incorporated herein by reference.

BACKGROUND OF THE INVENTION

1. Field of the Invention

The present invention relates generally to transportable, deployable renewable energy power boxes, and more specifically, to a power box for use in remote locations and emergency situations to provide renewable power and other temporary or semi-permanent services.

2. Description of the Related Art

During emergency relief situations, military deployment situations, on construction sites, and in remote locations far from population centers, the problem of power and water treatment looms large. Often people rely on gasoline powered generators to provide temporary power, but this is an extremely inefficient method.

Small portable solar-powered systems have been created for charging portable electronic devices, such as laptop computers and cellular phones, but existing systems have limited use.

What is needed is a way to transport a means for generating a large amount of electrical power and/or water treatment solutions to an isolated location quickly.

Heretofore there has not been available a deployable hybrid power box with the advantages and features of the present invention.

SUMMARY OF THE INVENTION

The present invention relates to a transportable, deployable system comprising a hybrid power box containing solar panels, wind turbine(s), fuel cells, fuel reformers, and other energy sources. The system could also include waste water and potable water inlet and outlet ports for water treatment. It will also allow for shelf-mounted solar and wind turbine installation for disaster recovery, backup power for telecommunication, military power, Homeland Security power, off grid homes and water and wastewater packaging domestically and internationally.

In use, the invention is placed at a remote location, at the site of an emergency, or may alternatively be used as a backup power source for an otherwise powered location.

The power box may contain a variety of energy-producing means in a variety of combinations. An exemplary embodiment will include a wind turbine, a solar panel array, and a number of fuel cells or fuel reformers. The box can be placed at a localized site where power is needed, and the various energy-creating devices can be deployed. The box may contain a number of rechargeable batteries for storing power generated in excess to power being used.

A box may also contain a means for the treatment of waste water or potable drinking water. The box may contain a water storage tank, similar to modern recreational vehicles, or it may have a way to purify water input into the system. The box may store waste water in a similar container, or may actually process the wastewater internally and output treated water.

BRIEF DESCRIPTION OF THE DRAWINGS

The drawings constitute a part of this specification and include exemplary embodiments of the present invention illustrating various objects and features thereof.

FIG. 5A is an isometric view of an embodiment of the present invention demonstrating a wind turbine being ejected from the main body.

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The present invention solves issues with the remote commissioning of power generation by completing and testing the complete renewable energy system in a single transportable package. That package can be shipped to a job site or remote location for immediate power production and/or water treatment.

The present invention features a transportable power box system 2 comprising generally a transport container 4 containing a plurality of power generation elements and water treatment elements for use in specific situations and locations, including emergency response situations, isolated off-grid locations, construction sites, military zones, and third-world countries. A preferred embodiment occupies a standard ISO shipping container with dimensions of 8 feet by 10 feet by 20 feet, or 8 feet by 10 feet by 40 feet. Sizes may vary though, depending on what components are necessary for a particular box. Ideally, renewable energy sources such as solar and wind power are used; however, gas-powered generators or other power sources can be included for additional power production.

II. Preferred Embodiment or Aspect Transportable Hybrid Power System 2

The embodiments discussed herein are merely illustrative of specific manners in which to make and use the invention and are not to be interpreted as limiting the scope of the instant invention.

Figure 1:
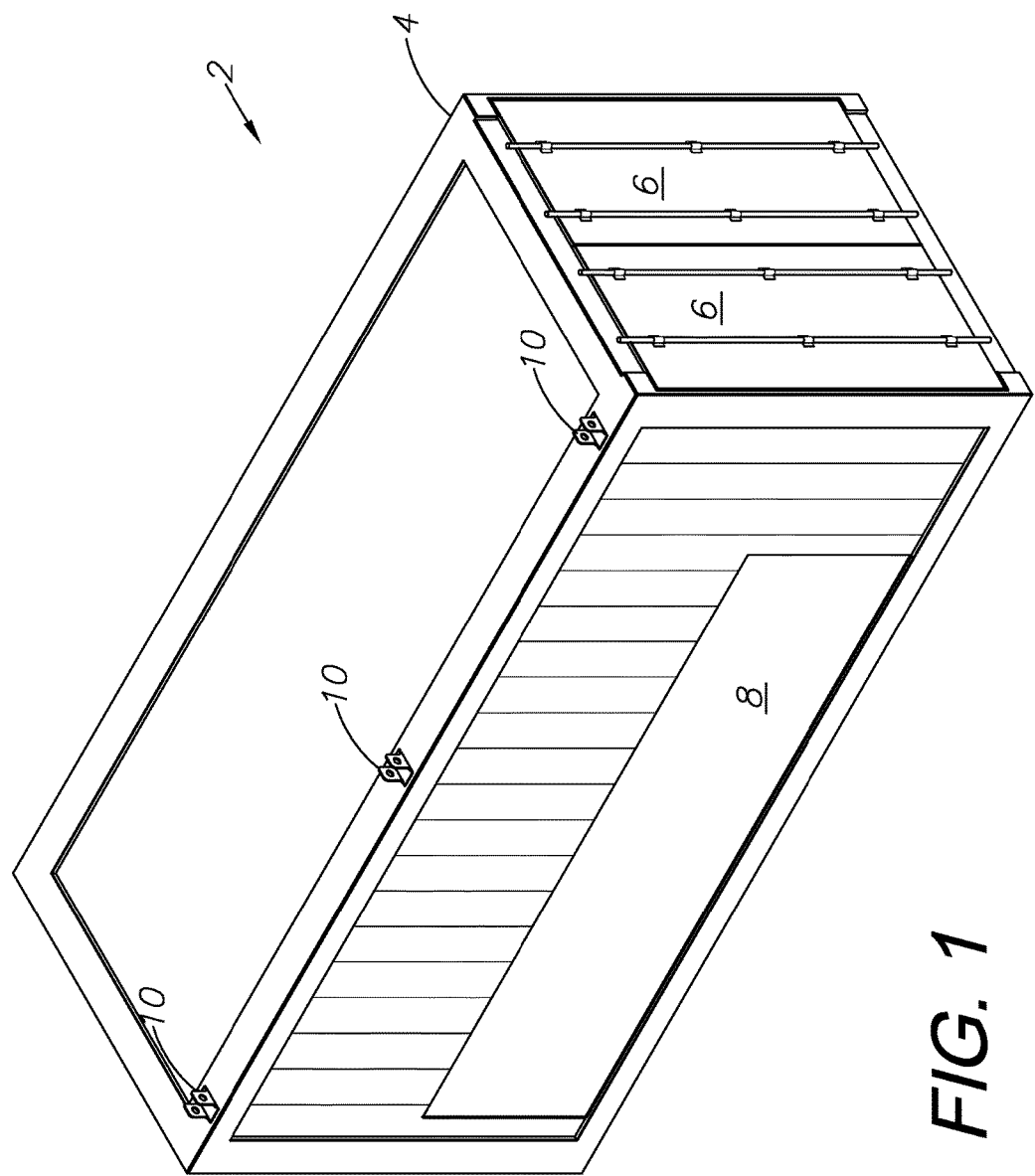
FIG. 1 is an isometric view of an embodiment of the present invention.

Referring to the drawings in detail, FIG. 1 illustrates a perspective view of a hybrid power system 2 taken from one corner. The system primarily includes a transport container box 4, typically an ISO shipping container. A pair of doors 6 are hingedly mounted to one side of the box 4. These doors could alternatively be a rolling vertical door, or any other type of common opening. These doors provide access to the internal components stored within the box 4.

A wind turbine access window 8 is shown in a close position. This window panel is cut into a side of the box 4, and allows the wind turbine power generation sub-system 26 to be ejected from within the box 4.

Figure 2:
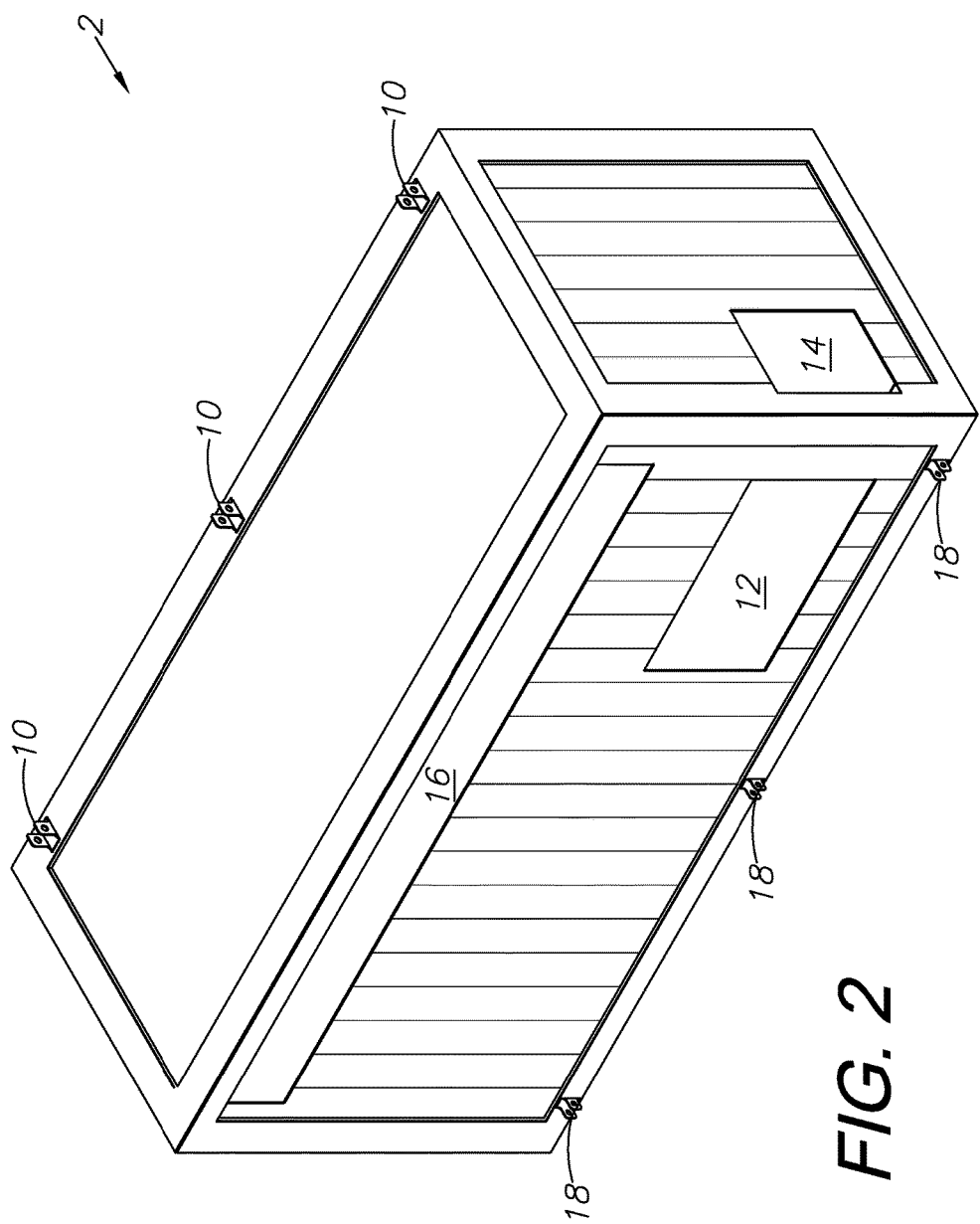
FIG. 2 is an isometric view of the same, as viewed from the opposite corner.

As shown more clearly in FIG. 2, a number of roof brackets 10 and side brackets 18 may be mounted to the exterior of the box 4 for use in anchoring the solar panel array 20 for optimal alignment.

FIG. 2, shown from the opposite corner as FIG. 1, shows a side window 12 and rear window 14 which allow access to power generation elements within the box 4, including a fuel cell power sub-system 42. Another window 16 allows the solar panel array 20 to extend out from within the confines of the box 4.

Figure 3:
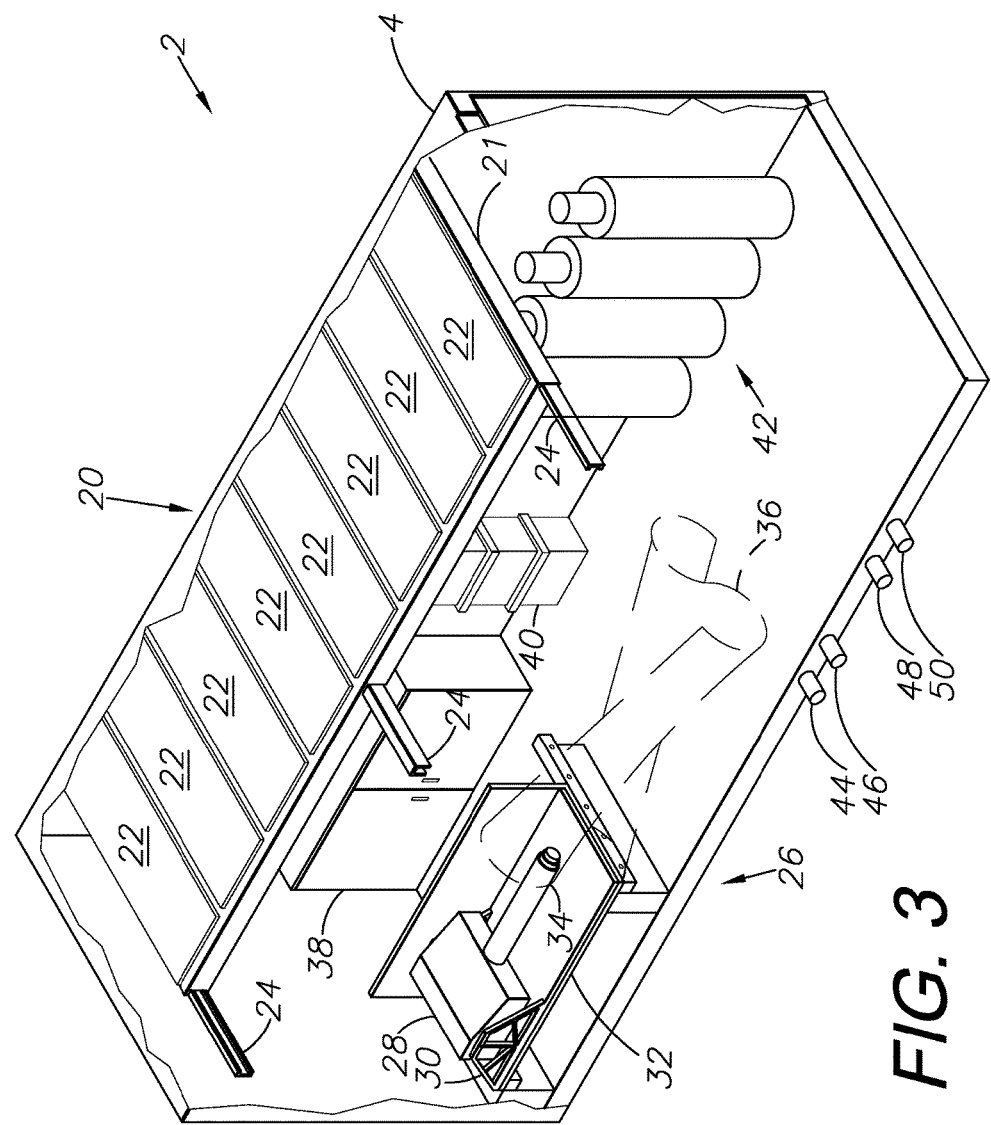
FIG. 3 is an isometric view of an embodiment of the present invention displaying the internal components through a cut-away.

FIG. 3 provides a view to the interior of the box 4, including a variety of power generating elements and other elements for use with the transportable power system 2. The embodiment displayed in FIG. 3 includes a wind turbine power sub-system 26, a solar panel array 20, a fuel cell power sub-system 42, a storage closet 38, and a number of batteries 40 for storing power generated by the various power generating sub-systems.

Figure 5B:
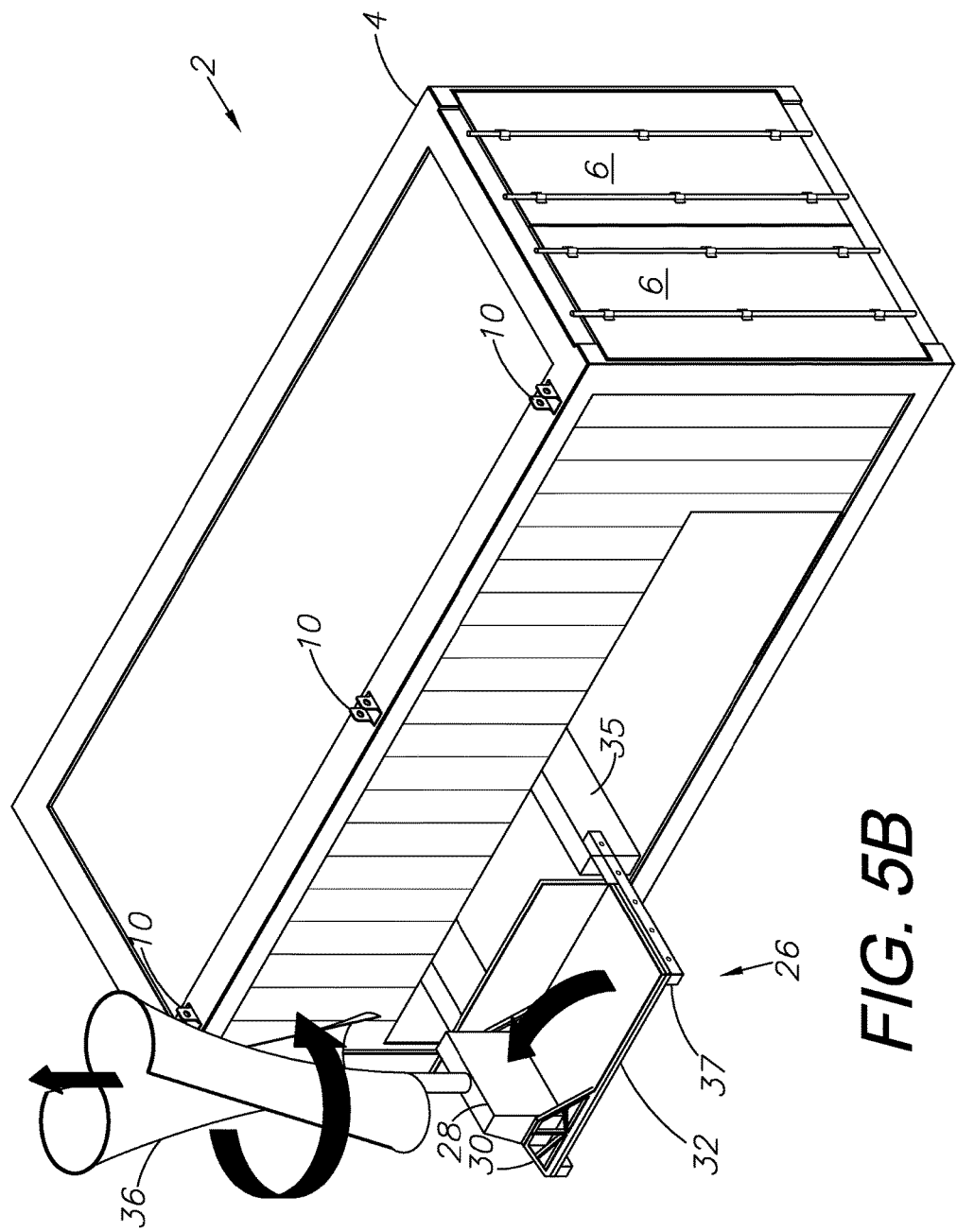
FIG. 5B is an isometric view of the same, showing the wind turbine being rotated and lifted into a final position.

An exemplary wind turbine sub-system includes a turbine base 28 hingedly mounted to a slide base 32 via a pair of mounting rails 30. A hydraulic extension arm 34 is affixed to the turbine base to raise and lower the wind turbine sail 36. As shown in more detail in FIGS. 5A and 5B, the wind turbine power sub-system 26 slides through the space left by window panel 8 when that panel is opened or removed. The wind sub-system slides out from the box 4 on a pair of rails 37 which are connected to a rail base 35 attached to the floor of the box. Once the wind sub-system slides out, as shown in FIG. 5A, the turbine base 28 can be rotated 90 degrees, as shown in FIG. 5B, and the wind sail 36 can be raised into the air to generate clean electricity from the wind.

Figure 4:
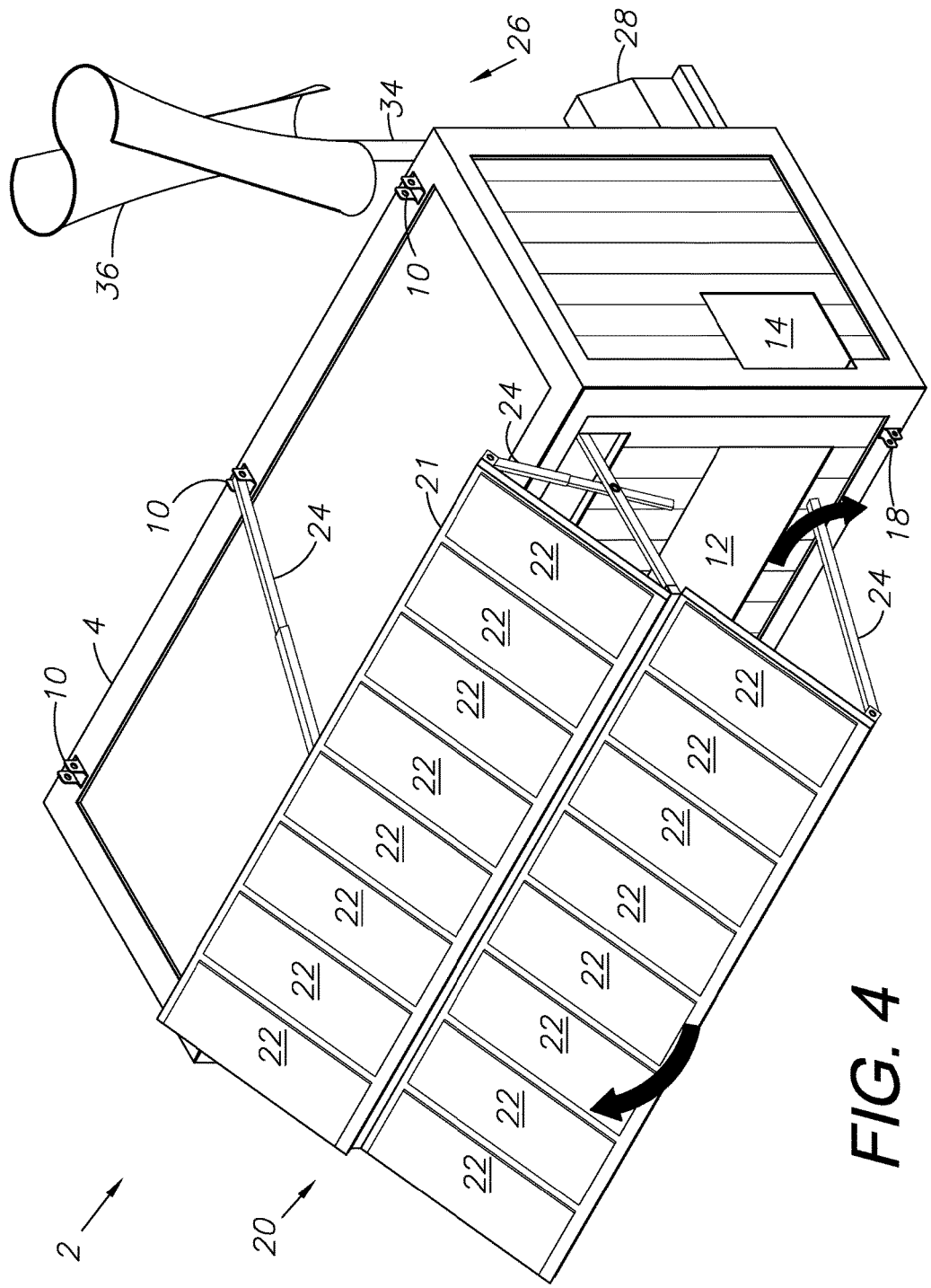
FIG. 4 is an isometric view of an embodiment of the present invention demonstrating the internal components being deployed.

As shown in FIG. 4, an exemplary solar panel array 20 includes a plurality of solar panels 22 mounted onto a solar panel frame 21. An embodiment of such an array may include multiple sets of panels which are folded on top of one another when stored, as shown in FIG. 3, but which are hingedly connected and may be extended for additional solar collection as shown in FIG. 4. In an embodiment of the present invention, the solar array 20 includes a number of frame members 24 which connect to roof brackets 10 and side brackets 18 for securing the array when it is in use.

An embodiment of the present invention may also include a water treatment sub-system. As shown in FIG. 3, potable water inlet 44 and outlet 46 ports would allow for water to be added to a storage tank (not shown) within the box 4, or into a water treatment device (not shown) where the water is treated and then stored. The water may then be used as drinking water.

Similarly, a wastewater inlet 48 and outlet 50 port could allow for the storage and draining and/or treatment of waste water. This could be especially effective in an emergency situation where waste water is a health concern.

Because the entire system is contained within a standard shipping container, the system can be delivered to a remote location via transport truck, railcar, or shipping barge. Smaller systems stored in smaller boxes can be delivered in the backs of standard commercial pick-up trucks or on trailers.

III. Alternative Embodiment or Aspect Transportable Hybrid Power System 102

Figure 6:
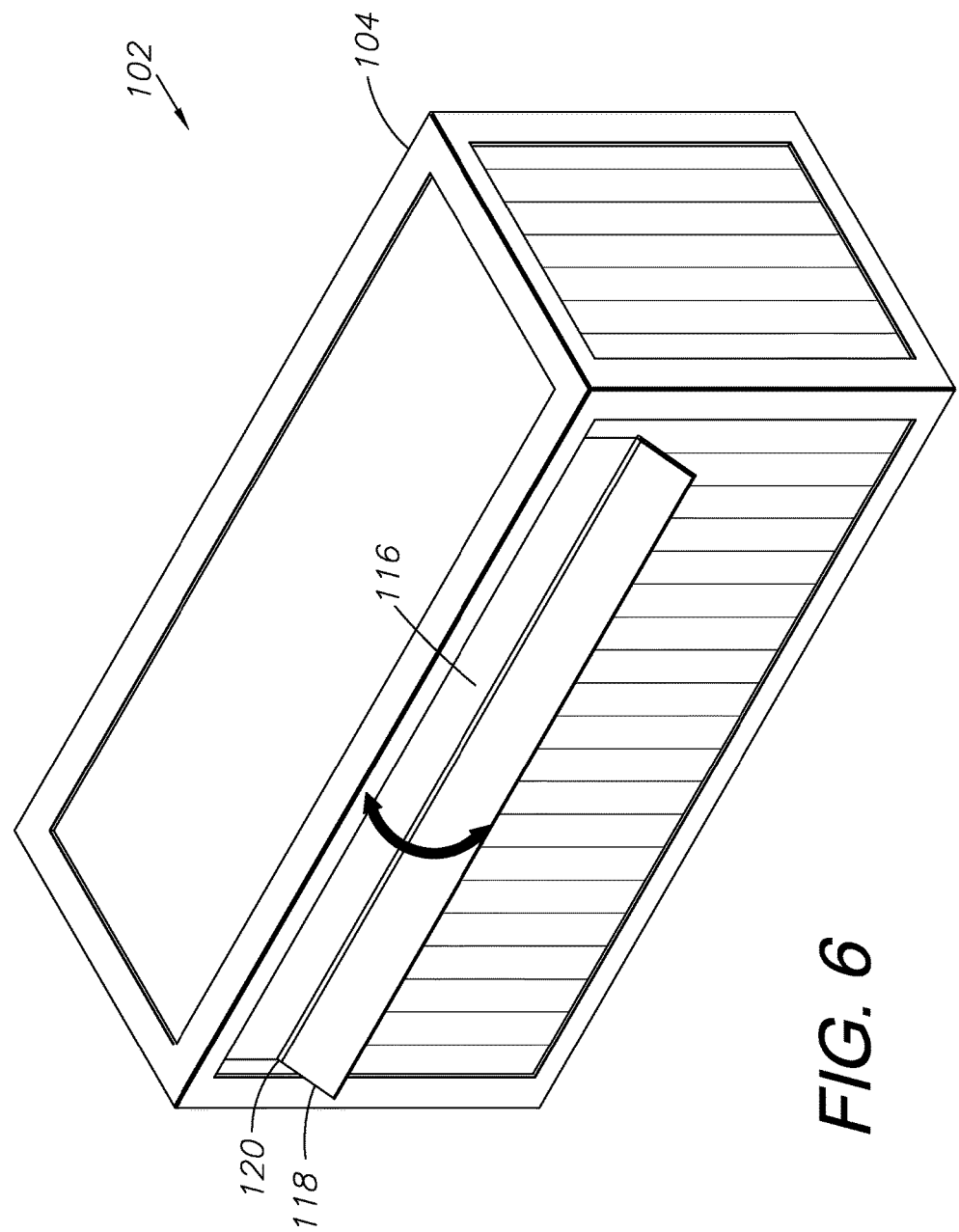
FIG. 6 is an isometric view of an alternative embodiment of the present invention.

FIGS. 6-10 show an alternative embodiment of a transportable hybrid power system 102. FIG. 6 shows a container unit 104 including a panel 118 connected to the container via a hinge 120 or other suitable connection element which allows the panel 118 to move, exposing an opening 116 for the solar panel array 115.

Figure 7:
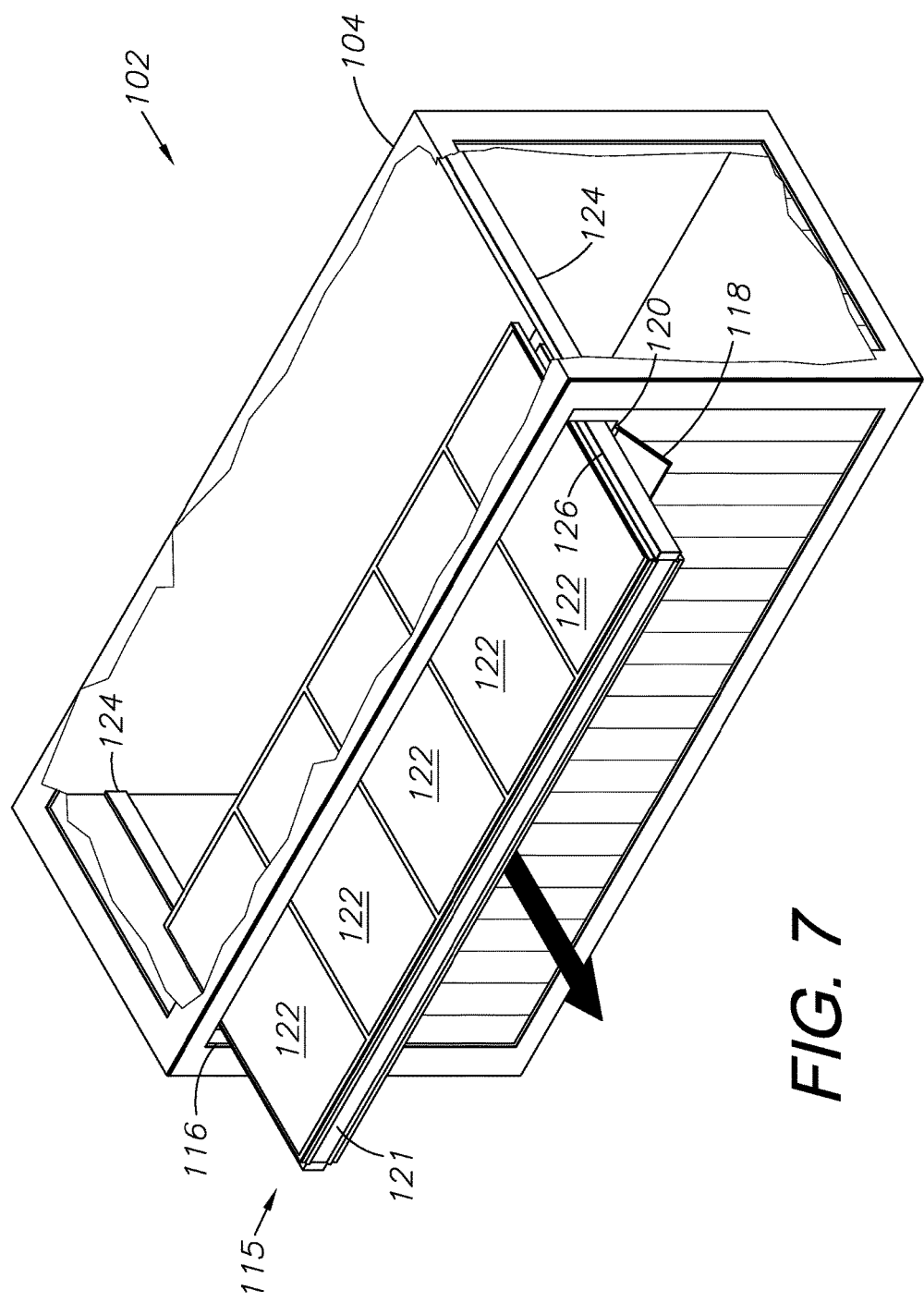
FIG. 7 is another isometric view thereof, showing a cutaway view inside of the alternative embodiment.
Figure 8:
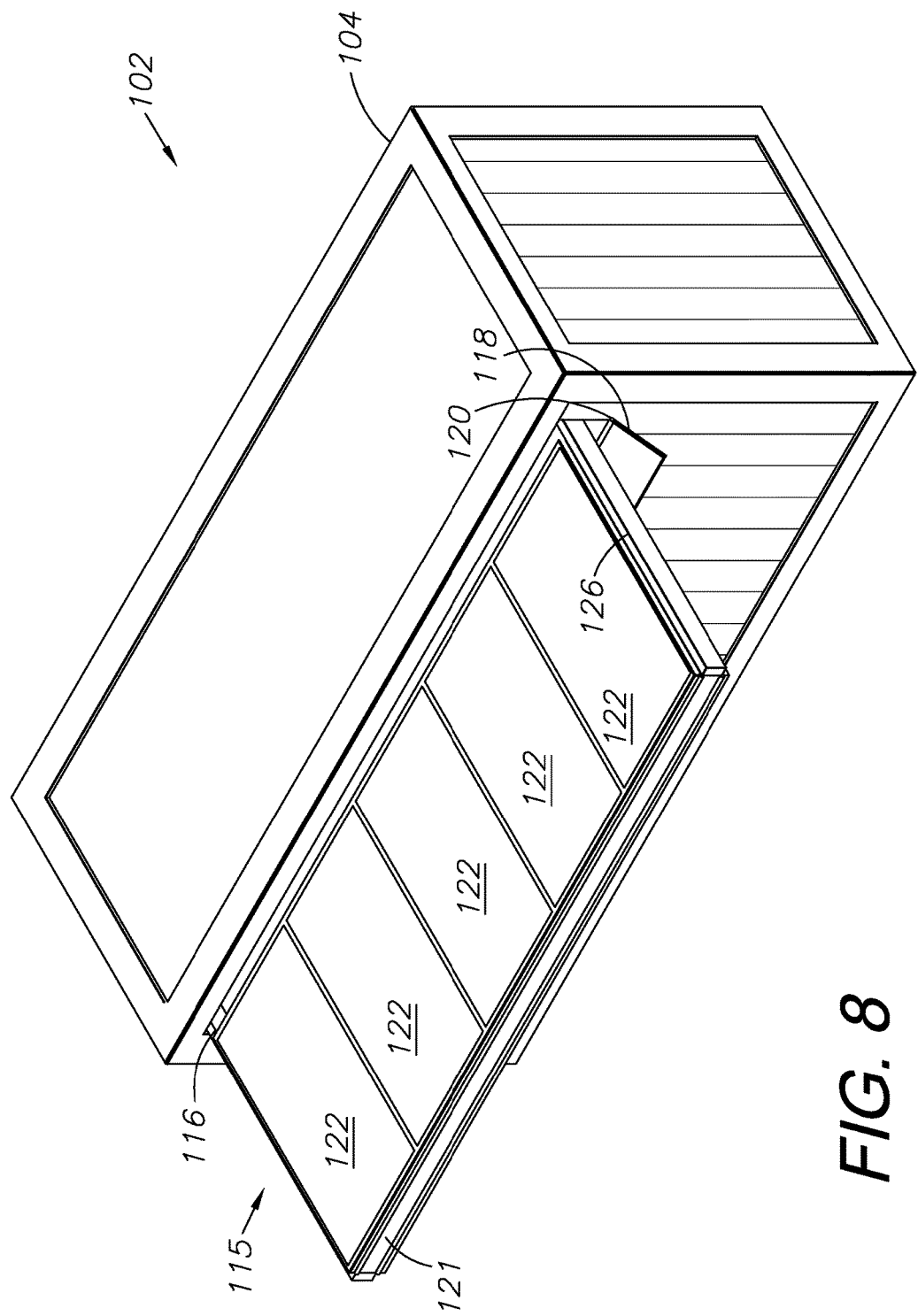
FIG. 8 is another isometric view thereof, showing an array of solar panels extending from the container.

FIG. 7 shows a cut-away view of some of the internal construction of the container 104. A pair of tracks 124 are mounted to either end of the container 104. Corresponding rails 126 are affixed to either end of the solar panel array 115, the rails 126 mounting the array 115 to the tracks 124 and allowing the entire array to slide in and out of the opening 116 in the container 104 exposed by the panel 118. In a preferred embodiment, the array 115 includes several solar panels 122 mounted to a frame 121 or built directly into a frame. The array 115 includes an upper set of panels 122 and lower set of panels 122 as shown more clearly in FIGS. 8 and 9. FIG. 8 shows the array 115 completely extended from within the container 104. The array 115 may be moved along the tracks 124 by using a hydraulic arm, pulleys, or any other suitable mechanical or electrical means of guiding the array out of the opening 116 of the container.

Figure 9:
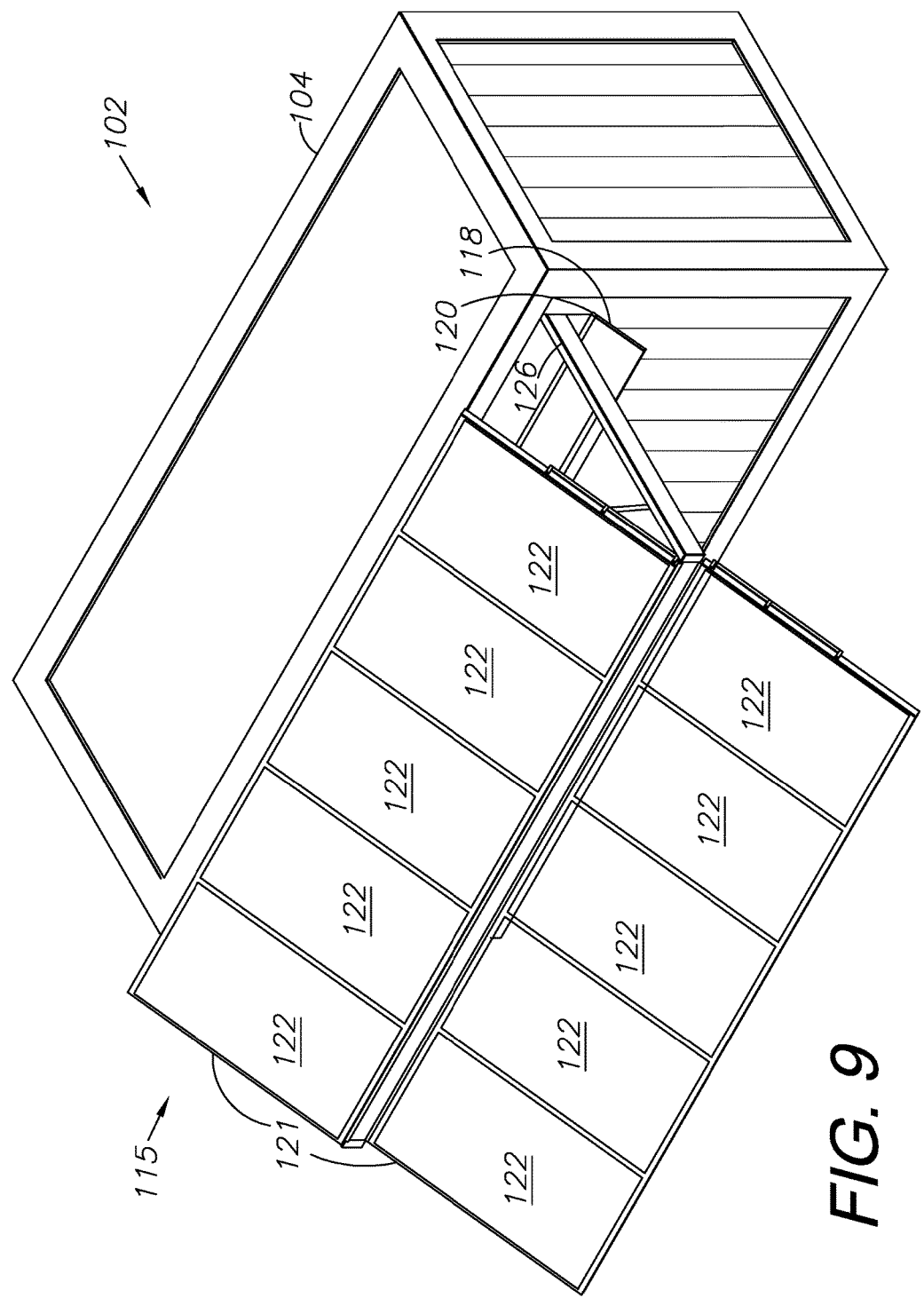
FIG. 9 is another isometric view thereof, showing the array of solar panels fully extended and opened.
Figure 10:
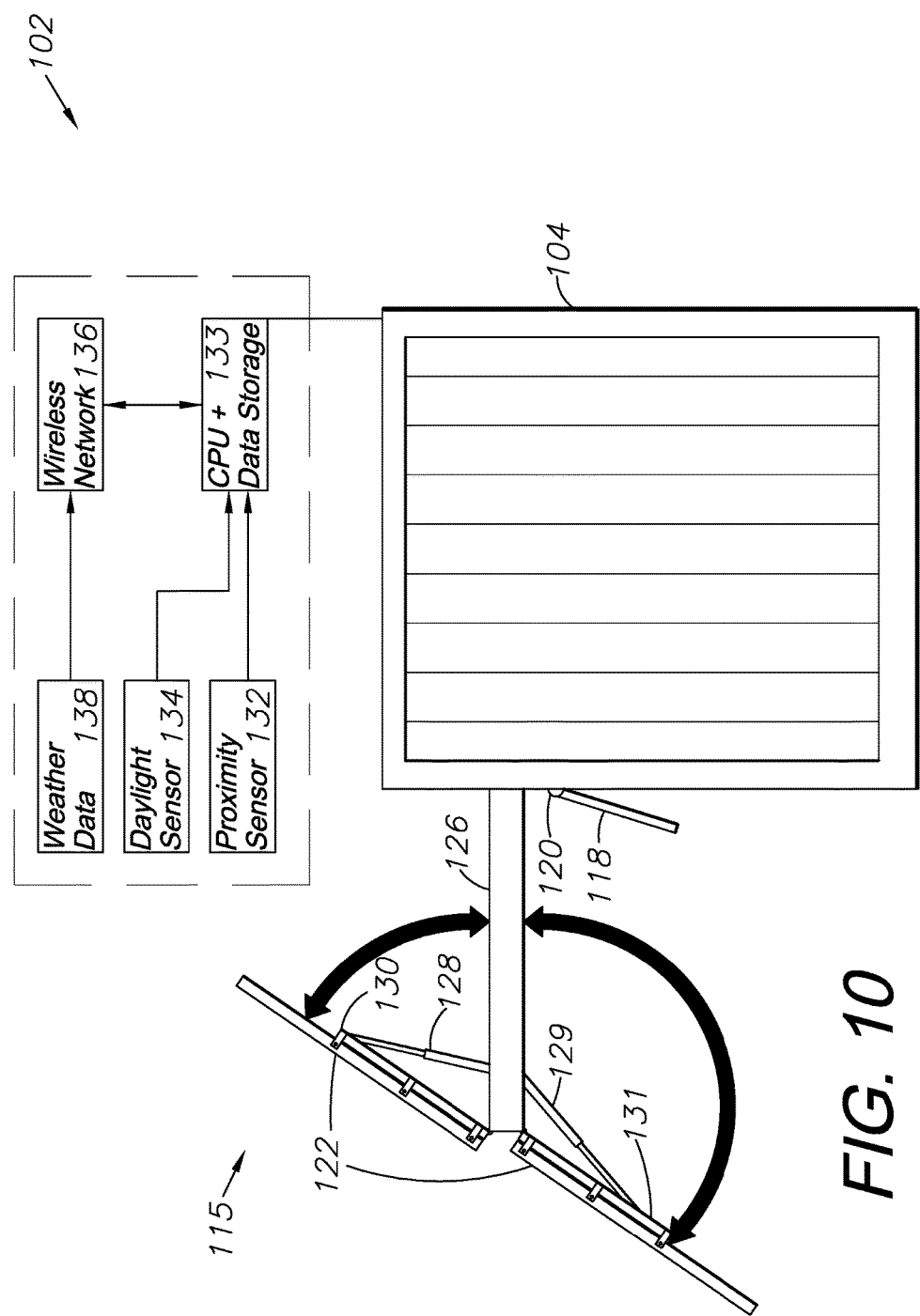
FIG. 10 is a side elevational view thereof, including a diagrammatic representation of components located within the container.

FIG. 9 shows the array 115 as the upper and lower sets of panels are pushed out to an optimal angle to receive solar light for providing electrical power. As shown in FIG. 10, an upper hydraulic arm 128 connected to an upper frame 130 pushes the upper set of panels upward, while a lower hydraulic arm 129 connected to a lower frame 131 pushes the lower set of panels downwards and outwards away from the starting position shown in FIG. 8.

FIG. 10 further shows a variety of instruments included within the power system 102. A computer having a CPU and data storage 133 controls and automates much of the power system 102. The computer is ideally connected to a wireless computer network 136 for communicating with external sources, such as a source providing weather data 138. Other sensors may be connected to the computer, such as a daylight sensor 134 for indicating when sunlight is present and a proximity sensor 132 for detecting the presence of persons in proximity to the container 104. The proximity sensor may be a motion sensor, sound sensor, or some variation or combination thereof. The proximity sensor and daylight sensor may also be replaced by external sources transmitting data through the wireless network 136 to the computer CPU 133.

The purpose of the computer 133 is to control when the solar panel array 115 is deployed or retracted into the container. To prevent damage from weather, tampering, theft, or other negative actions, the system is automated to retract the solar panel array 115 in a variety of circumstances.

Figure 11:
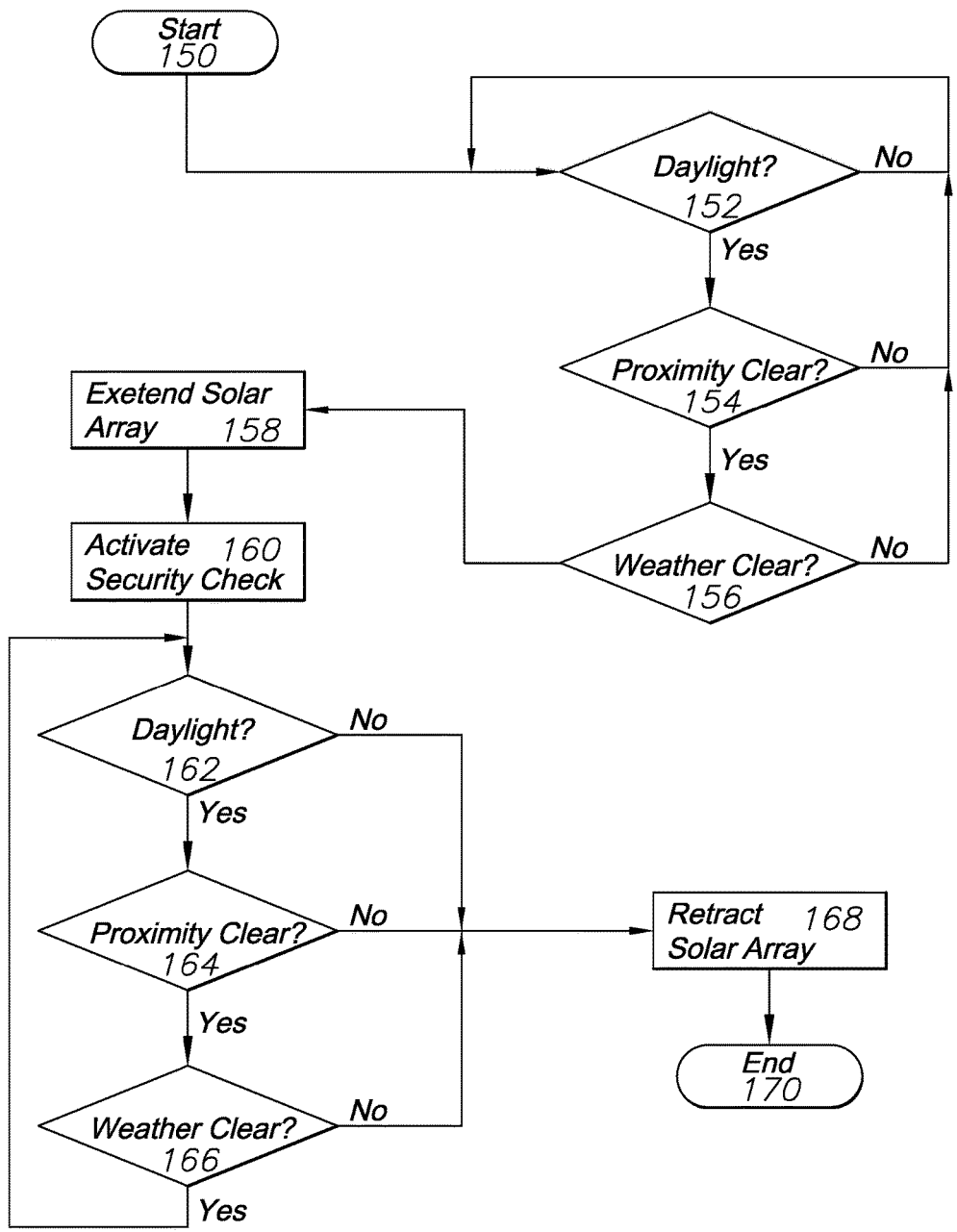
FIG. 11 is a flowchart diagramming the steps taken in practicing an embodiment of the present invention.

FIG. 11 shows the steps required for practicing the automated portions of the present invention, preventing the damage and theft as discussed above. The process starts at 150. The computer receives information from sensors or other third party sources via the wireless network to check to see if there is sunlight at step 152. If there is sunlight, the system will check to make sure the proximity is clear at 154. This step detects for potential threats of theft or vandalism. If there are no threats, the system checks the weather to make sure there is no potential for storms that may damage the array at 156. If any of these three checks fail, the system continues checking until all required checks are satisfied. Other checks may also be employed.

If all of the checks are passed, the solar array is extended at 158 and begins collecting solar energy and creating power. The computer then activates a security check at 160. Again, the computer will actively monitor for daylight at 162. When the sun is blocked or goes down, the solar array will retract at 168 and the process ends at 170. Similarly, if a threat is detected by the proximity sensor or other similar device at 164, the solar array retracts at 168 and the process ends at 170. Also, if the computer receives a weather report indicating potentially damaging weather approaching the container 104 at 166, the solar array automatically retracts at 168 and the process ends at 170. If no checks are negative, the security check continues monitoring the system 102.

IV. Alternative Embodiment or Aspect Transportable Hybrid Power System 202

FIGS. 12-17 show yet another alternative embodiment hybrid power system 202 including a container body 204 housing multiple features and functions for producing or providing electrical power and other services at a remote location.

Figure 12:
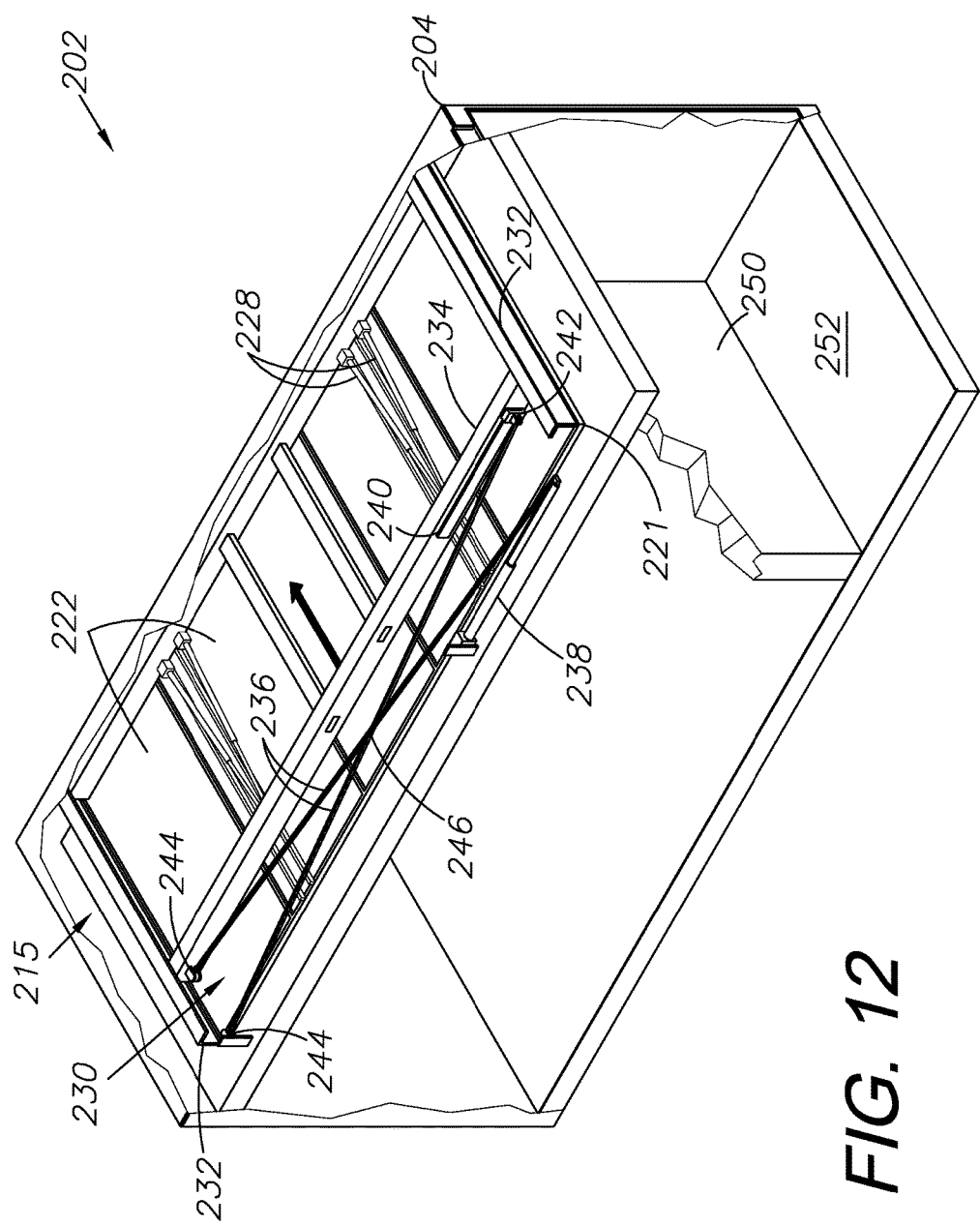
FIG. 12 is a three-dimensional isometric view of an alternative embodiment of the present invention disclosing additional features including a scissor-type mover.
Figure 13:
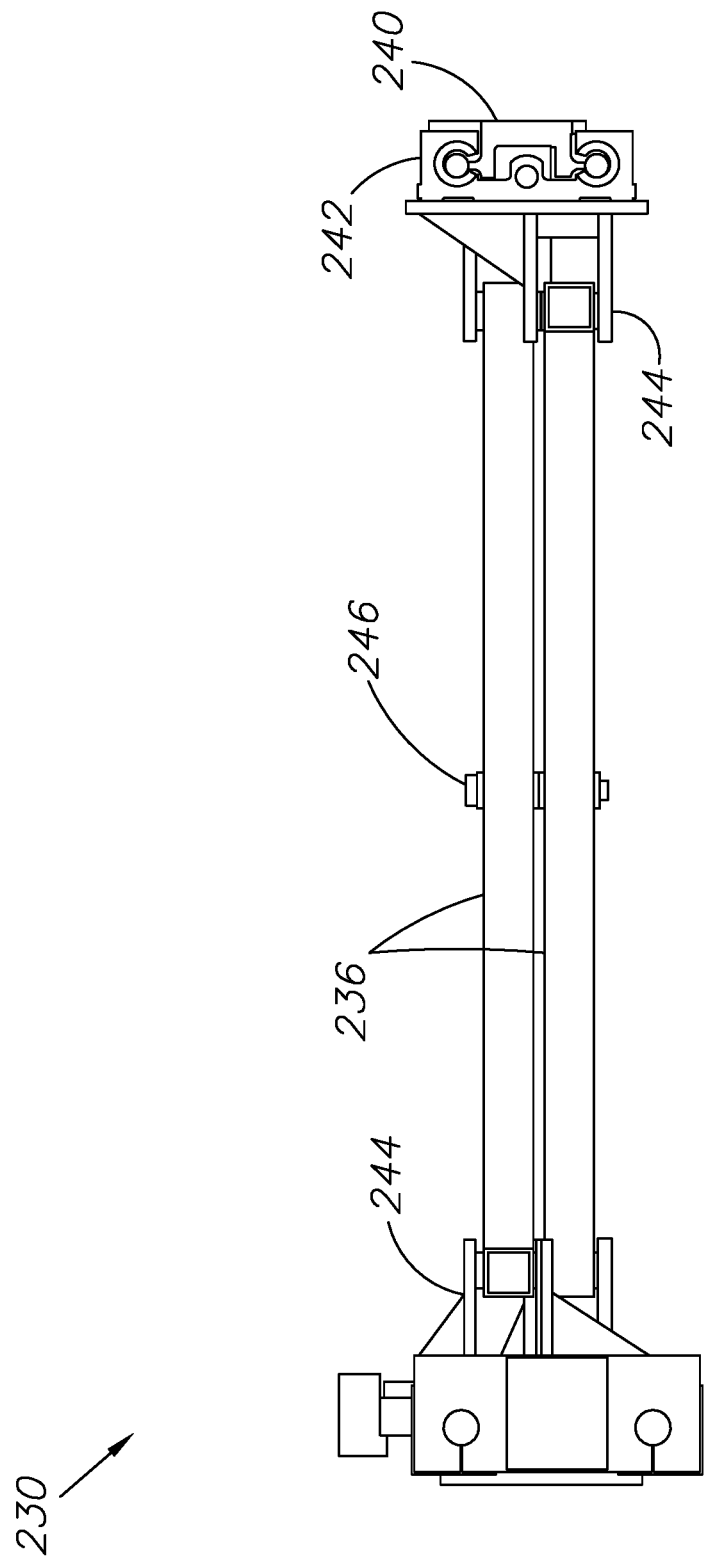
FIG. 13 is a side elevational view of the scissor-type mover element thereof.
Figure 14:
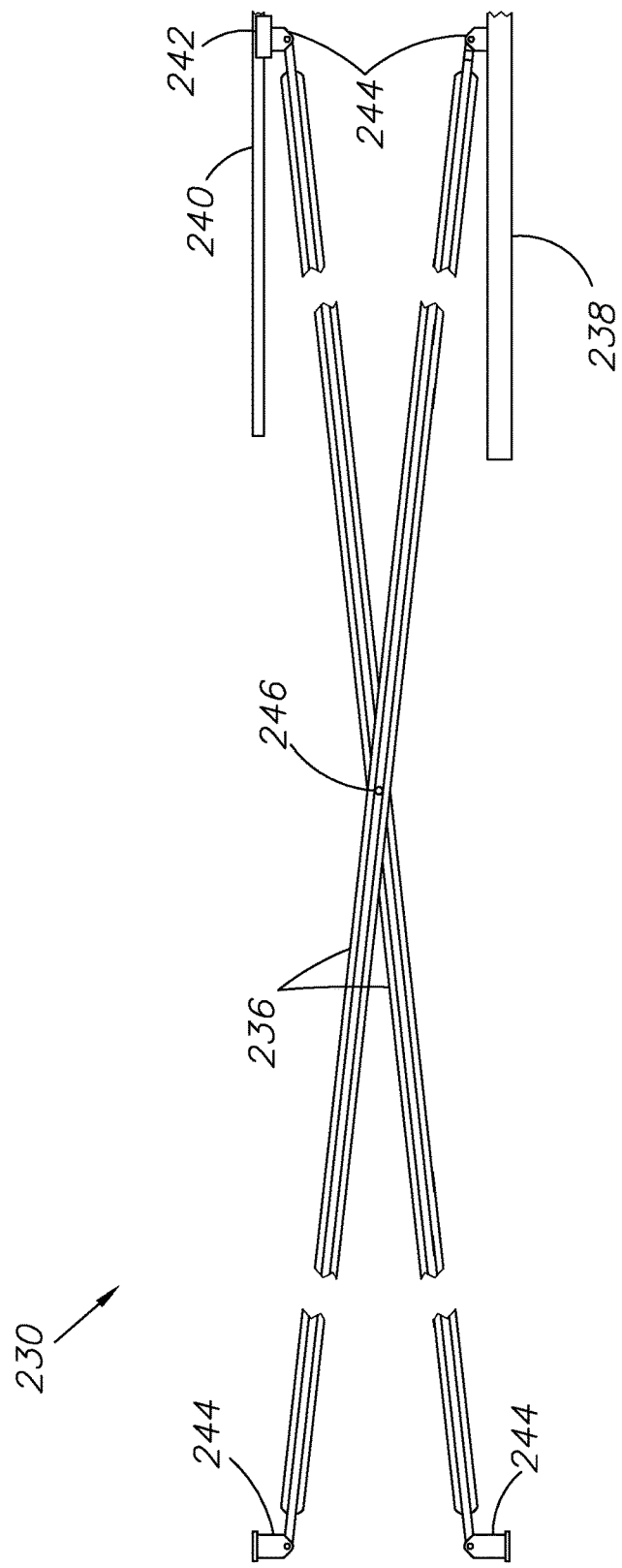
FIG. 14 is a top plan view thereof.
Figure 15:
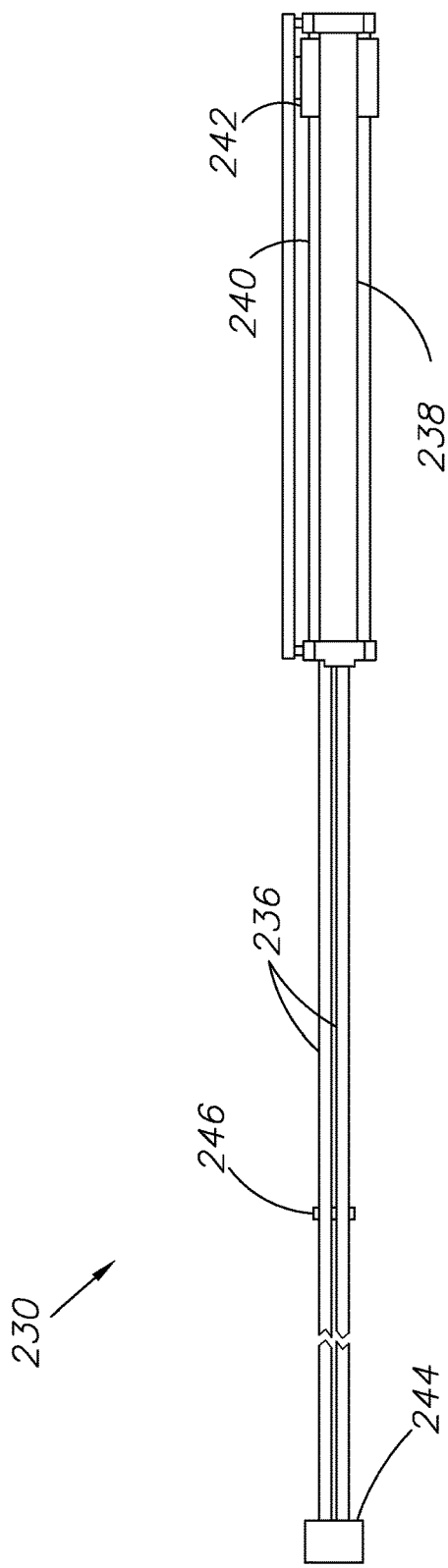
FIG. 15 is a front elevational view thereof.

FIG. 12 shows a very similar hybrid power system 202 to the systems 2, 102 discussed above. A container 204 includes a solar panel array 215 including a frame 221 housing multiple solar panels 222 for deployment outside of the container 204 and storage within the container when not in use, such as during storms, at night, or during detected times of danger or security issues. Here, the solar panel array 215 is connected to a pair of structural beams 234 mounted along a pair of channel rails 232 which help to guide the entire structure into and out of the container 204. When the array 215 is outside of the container, the frames 221 and panels 222 can be positioned for optimal sunlight with the hydraulic arms 228 which move the solar panels to face the sun. This is very similar to the process discussed with the system 102 above.

A scissor lift assembly 230 operates to move the solar panel array 215 into and out of the container 204. This lift assembly only moves the array horizontally, after which the hydraulic arms 228 of the solar panel array 215 move the panels 222 into vertical orientation. The scissor lift assembly 230 connects to the container and structural beams 234 at four connector joints 244 which allow the ends of the scissor lift arms 236 to pivot freely. A central pin 246 connects the two scissor arms 236 at a central location to allow the two arms to scissor about that point. One end of one scissor arm 236 is connected to a hydraulic arm 238 which powers the scissor lift 230. The opposing end of the other scissor arm 236 connects to a slide 242 which is engaged with a rail 240, allowing the scissor arm to slide along the rail as the solar panel array 215 is pushed out of the container 204. This could also be used to provide an angular orientation to the solar panel array 215.

Also shown in FIG. 12 is an optional interior wall 250 which separates a contained room 252 within the interior of the container. This room may be used to store fuel tanks, generators, batteries, or other equipment which is separated for fire protection purposes or security purposes, limiting access to those items to only allowed personnel.

FIGS. 13-16 show the scissor lift assembly 230 in more detail.

Figure 16:
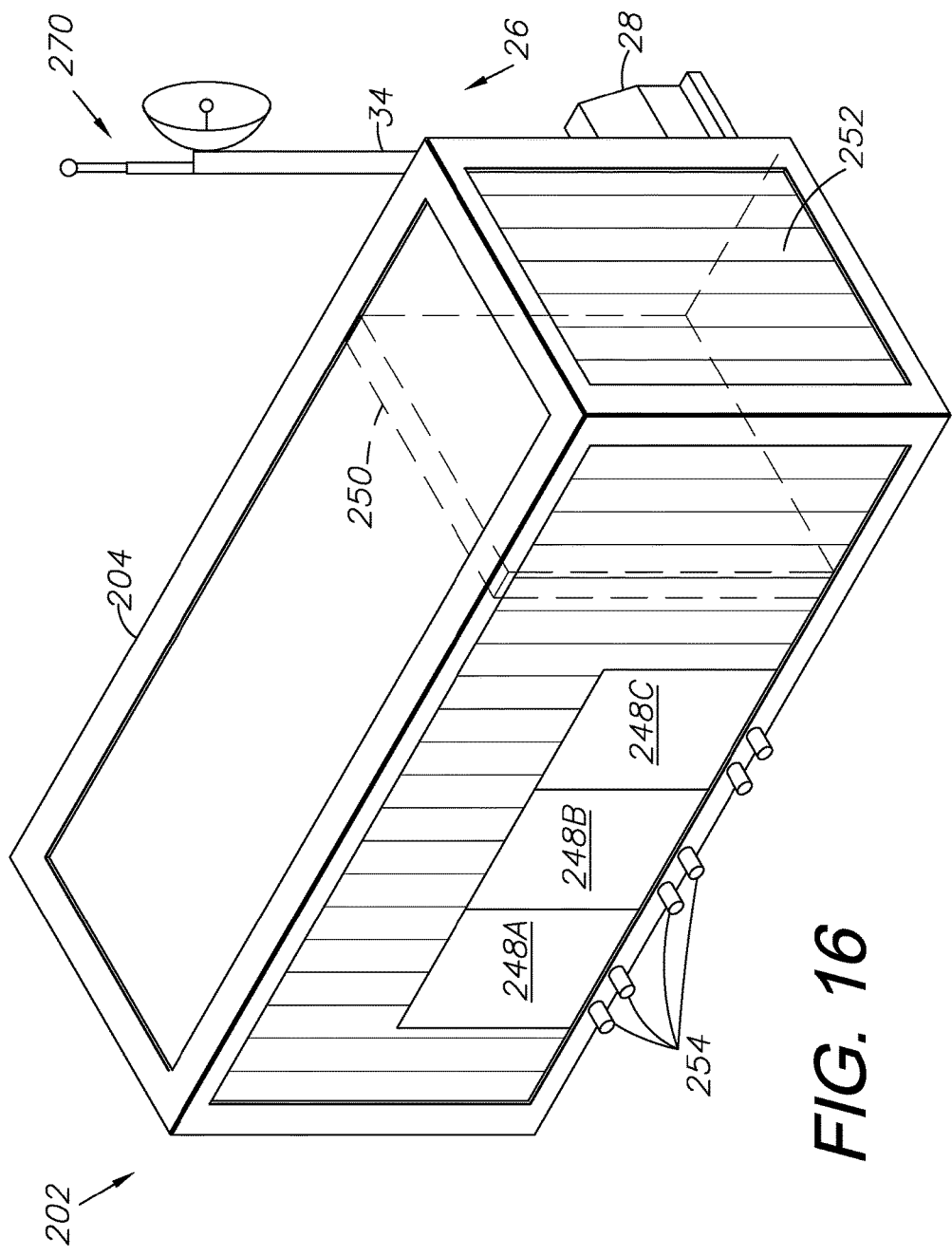
FIG. 16 is a three-dimensional isometric view of the alternative embodiment thereof, showing additional features.

FIG. 16 shows an exterior view of the container 204. This example shows three alternative access doors 248A, 248B, and 248C, each with access conduits 254 for running cables or other services into and out of the container 204. Each door would belong to a separate entity utilizing the container system 202. For example, in telecommunications, there are several companies who may all wish to access the container 204, but who wish to keep their separate equipment secure and protected. Each company would then lease portions of the container and have secure access to only the equipment stored in that portion of the container, while maintaining security of the other companies' equipment. The side room 252 would again have even separate access from the entities that have access to the front doors 248A, 248B, 248C.

Also shown is the wind turbine subsystem 26 of the previous embodiments, shown here without the wind turbine 36 but instead with an antenna array 270 for surveillance or to deliver telecommunications data to or from the container system 202. Otherwise this assembly would be the same or similar to the system as discussed above.

Figure 17:
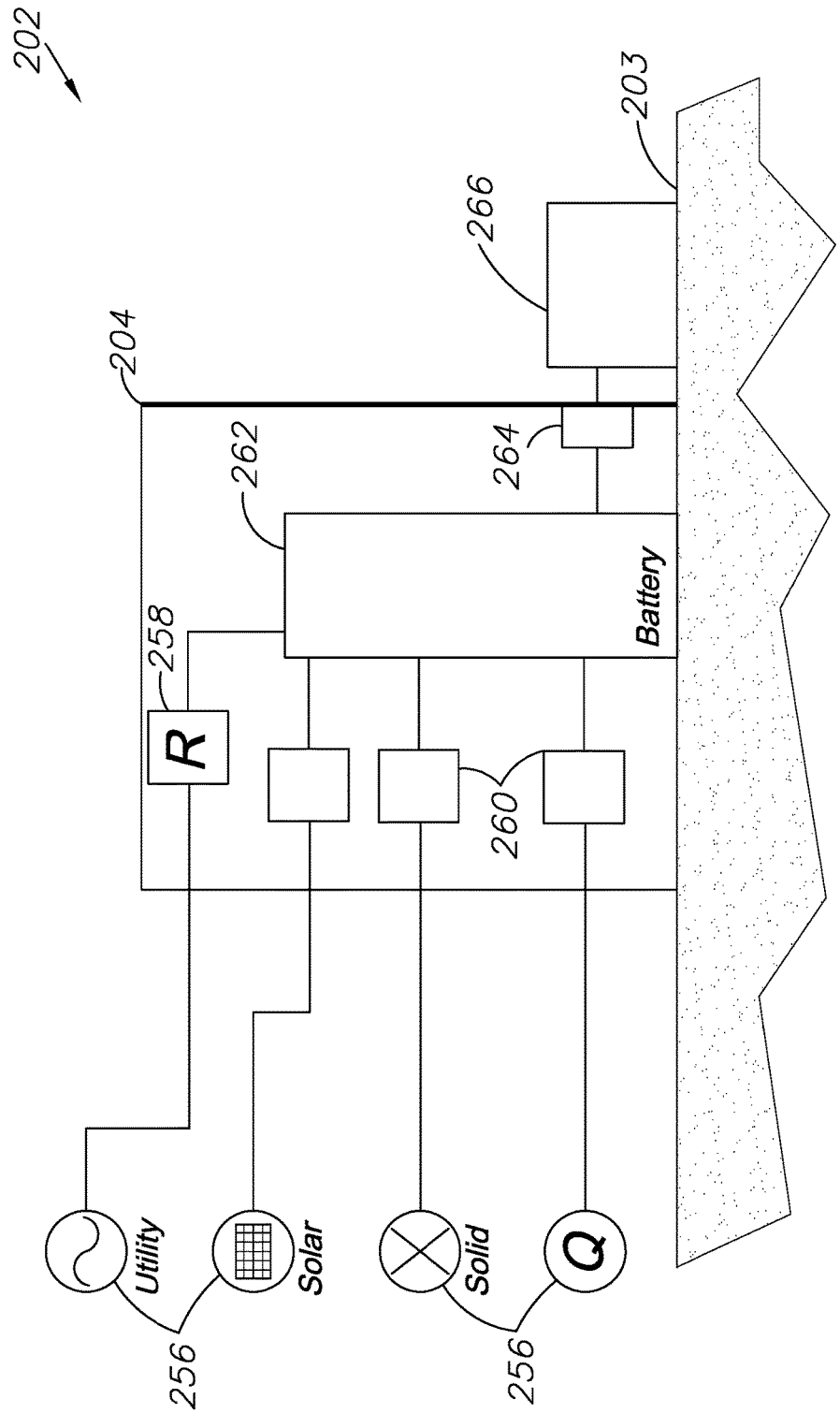
FIG. 17 is a side elevational view thereof diagrammatically showing additional features.

FIG. 17 shows a diagrammatic view of the container system 202 wherein multiple sources of power input 256, such as external utility power, external solar or otherwise renewable power, external solid fuel power (e.g. wood burning), or external fuel source power (e.g. diesel generator). The power enters receivers 258 or converters 260 within the container, where the power would be converted and stored into the batteries 262. This way the DC power can be accessed via an access port 264 which allows external equipment 266 to use the power when necessary, thereby providing reliable DC power for local uses in remote locations. As shown the container is placed on the ground 203, or may be elevated for security purposes.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A transportable power supply system comprising:
    a container enclosing an interior space;
    wherein said container interior space is configured to contain a selected plurality of power sources;
    a deployable solar array assembly comprising a plurality of solar panels, half of said plurality of solar panels being affixed to an upper structural frame thereby comprising a top array, and another half of said plurality of solar panels being affixed to a lower structural frame thereby comprising a bottom array;
    said solar array assembly mounted on tracks within said container interior space;
    a panel affixed to said container, said panel configured to move relative to said container, thereby providing an opening in said container;
    a scissor lift assembly comprising two arms pinned at a central point, wherein a first end of each of said two arms is connected to said solar array assembly and a second end of each of said two arms engages internal structural elements of said container interior space;
    said scissor lift assembly configured to move said solar array between a first, stored position within said container and a second, exposed position exterior from said container along said tracks, whereby said solar array passes through said opening;
    an upper actuator arm configured to move said top array from a first, generally horizontal orientation to a second, deployed orientation;
    a lower actuator arm configured to move said bottom array from a first, generally horizontal orientation to a second, deployed orientation; and
    wherein said deployed orientations of said top array and said bottom array are configured based upon receiving optimum solar exposure.

2. The system of claim 1, further comprising:
    a plurality of power sources selected from the group consisting of a wind turbine, a solar panel array, a hydrogen fuel cell, a fuel reformer, a battery, a gasoline generator, and a diesel generator.

3. The system of claim 1 further comprising:
    a computer having a CPU and data storage, said computer configured to communicate with remote data sources; and
    said computer configured to control the deployment of said solar array.

4. The system of claim 3, further comprising:
    a sensor configured to supply data to said computer;
    said computer configured to interpret said data; and
    said computer further configured to automatically deploy or retract said solar array depending upon said data.

5. The system of claim 4, wherein said sensor is a sensor selected from the list comprising: a solar sensor; a motion sensor; and an audio sensor.

6. The system of claim 3, further comprising:
    a remote weather detection system generating weather data;
    said computer configured to receive said weather data; and
    said computer further configured to automatically deploy or retract said solar array depending upon said weather data.

7. The system of claim 1, further comprising:
    a wall separating said container interior space into at least two rooms; and
    wherein access to at least one of said at least two rooms is restricted.

8. The system of claim 7, further comprising:
    a first access door configured to provide access to a first of said at least two rooms;
    a second access door configured to provide access to a second of said at least two rooms;
    whereby access to said first access door is limited to a first party; and
    whereby access to said second access door is limited to a second party.

9. The system of claim 8, wherein said second party comprises a telecommunications company.

10. The system of claim 1, further comprising:
    one of said two arms of said scissor lift assembly engaging a hydraulic arm connected to a structural element of said container; and
    said hydraulic arm configured for moving said scissor lift assembly in a horizontal orientation about said container.

11. The system of claim 1, further comprising:
    one of said two arms of said scissor lift assembly affixed to a slide element engaging a rail connected to a structural element of said container; and
    said slide element configured to slide along said rail, thereby adjusting an angle of said solar array assembly.

12. The system of claim 1, further comprising:
    a battery array configured for storing electrical power produced by at least one electrical power source located externally from said container;
    wherein said at least one electrical power source is selected from the list comprising: a solid fuel generator; a solar panel array; an electrical utility; a liquid fuel generator; or a wind turbine; and
    a connection to said battery array wherein direct current power is configured to be provided through said connection to a piece of electrical equipment located in proximity with said container.

* * * * *